Sept. 6, 1938.　　　G. R. GEHRANDT　　　2,129,172
INTERNAL COMBUSTION ENGINE
Filed Jan. 4, 1936　　　2 Sheets-Sheet 1
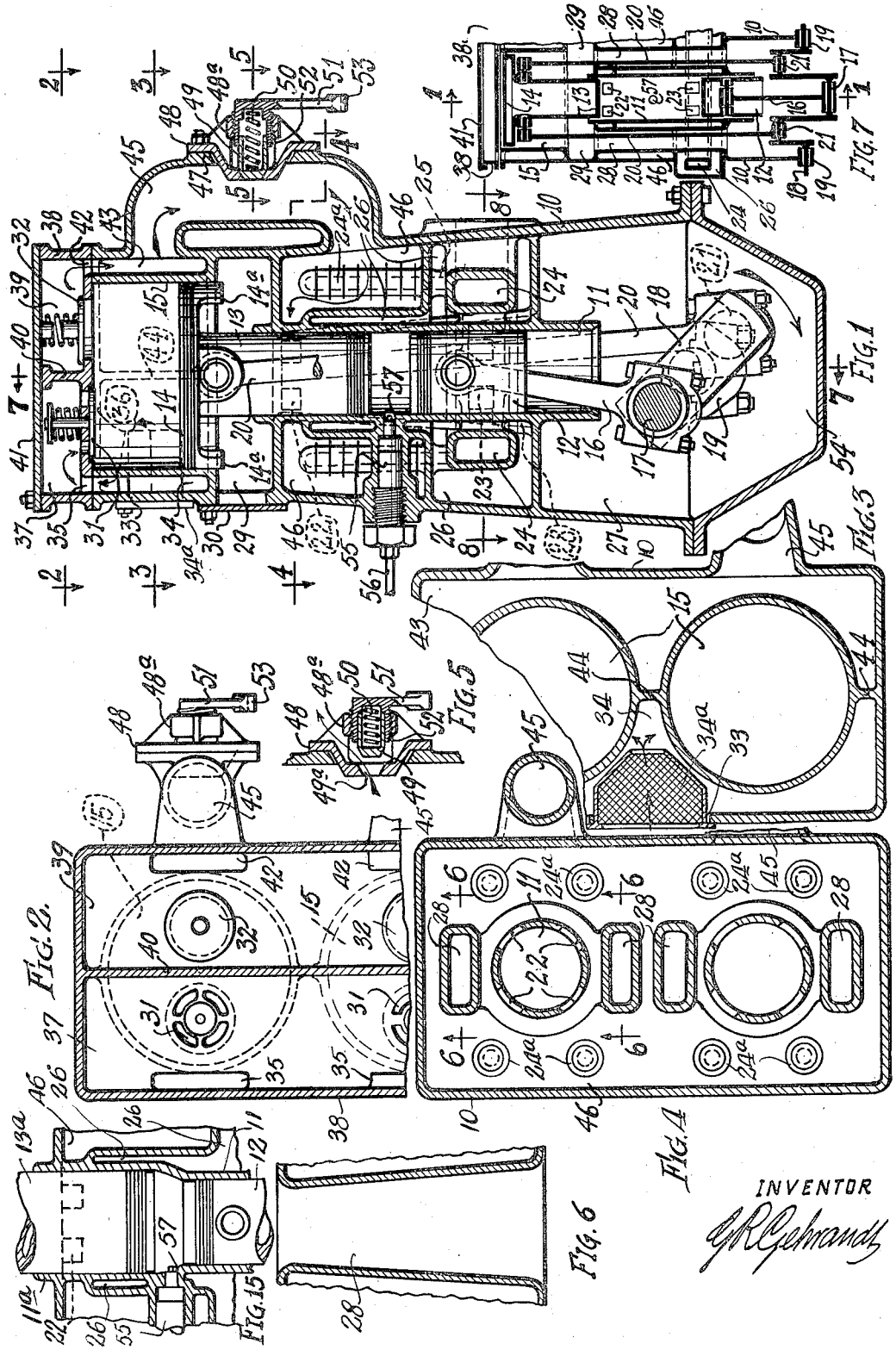
INVENTOR
G. R. Gehrandt Sept. 6, 1938.  G. R. GEHRANDT  2,129,172
INTERNAL COMBUSTION ENGINE
Filed Jan. 4, 1936  2 Sheets-Sheet 2
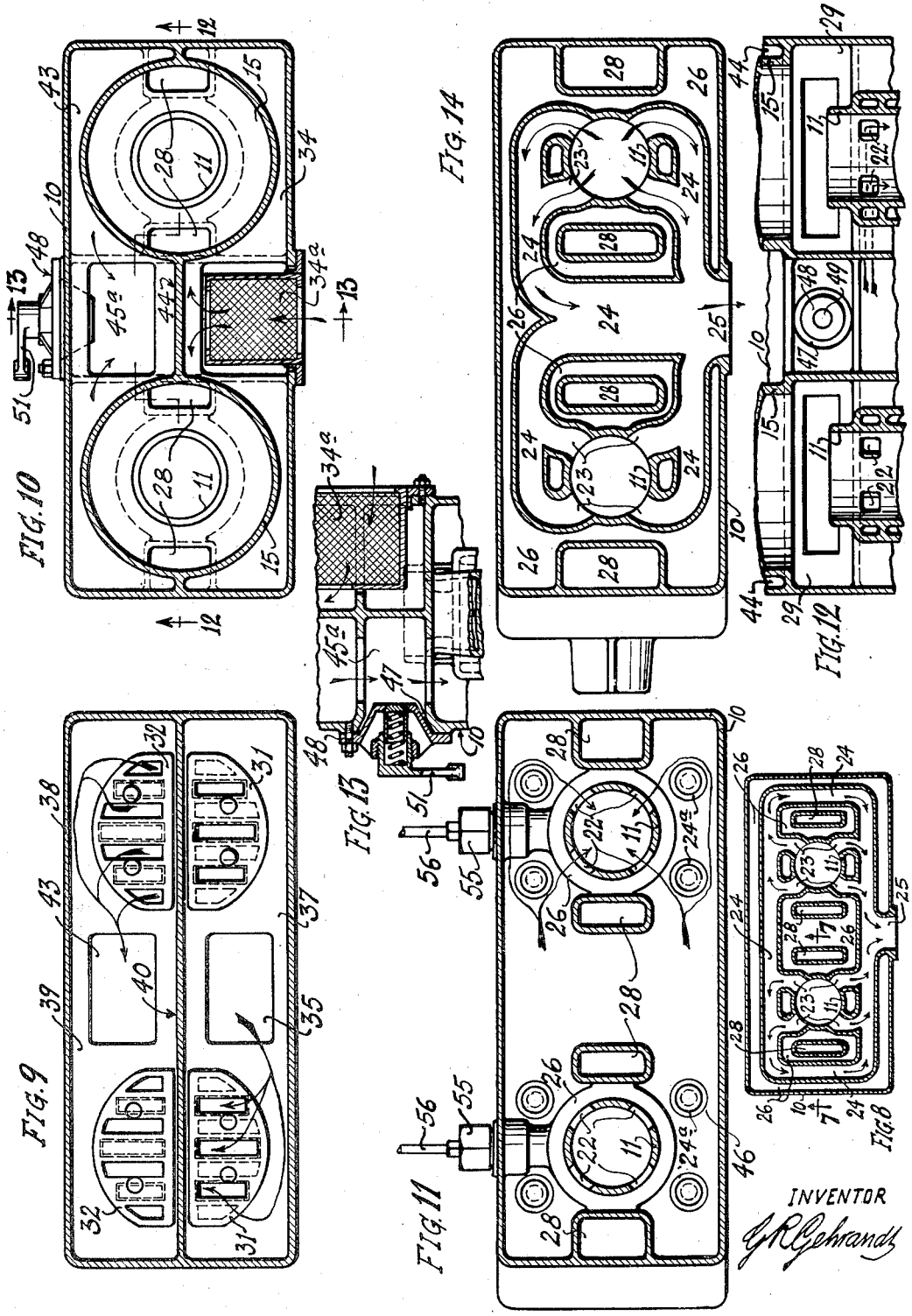

Patented Sept. 6, 1938

2,129,172

UNITED STATES PATENT OFFICE 2,129,172

INTERNAL COMBUSTION ENGINE

Gustav R. Gehrandt, Evanston, Ill.

Application January 4, 1936, Serial No. 57,490

40 Claims. (Cl. 123—51)

This invention relates in general to internal combustion engines, but more particularly to two cycle engines of the Diesel type, and specifically to engines having opposing pistons; i. e. engines with two power pistons working in one cylinder in directions towards and away from each other, the fuel being ignited between the two power pistons, and an air pump being provided for furnishing the scavenging and combustion air.

In order to adapt this type of engine for high speed work, and thereby increase the power output of the engine per piston displacement unit, it is necessary to construct the engine, and particularly the moving parts thereof, as light as possible, and furthermore it is very essential that the engine be completely balanced in every respect.

It is one of the objects of the present invention to provide an improved, compact and self-contained engine with a minimum amount of accessories mounted on the outside of the engine.

Another object of the invention is to increase the specific output of the engine, i. e., the amount of horse power obtainable per piston displacement unit.

It is another object of the invention to provide a simple method of controlling the pressure of the scavenging and combustion air and thereby control the power output of the engine.

It is a further object of the invention to improve the mechanical as well as thermal efficiency of the engine and to simplify the design thereof, reducing the cost of manufacture.

Another object of the invention is to completely balance the engine statically as well as dynamically.

A still further object of the invention is to provide a simple means of supercharging the engine.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a vertical, longitudinal, sectional view of an engine of this character constructed in accordance with the principles of this invention and with parts broken away and parts omitted.

Figure 2 is a detail, horizontal, sectional view taken on line 2—2, Figure 1.

Figure 3 is a detail, horizontal, sectional view taken on line 3—3, Figure 1, with parts omitted.

Figure 4 is a detail, horizontal, sectional view taken on line 4—4, Figure 1, with parts omitted.

Figure 5 is a detail, sectional view taken on line 5—5, Figure 1.

Figure 6 is a vertical, sectional view of one of the guides for the connecting links between the piston and the crank shaft.

Figure 7 is a diagrammatic view as taken on line 7—7, Figure 1. Figures 1 and 8 are on a reduced scale with respect to Figure 1 and on the same scale with respect to Figure 8.

Figure 8 is a detail sectional view taken on line 8—8, Figure 1, on a reduced scale.

Figure 9 is a sectional view similar to Figure 2, with parts omitted, and with cylinders further apart, and a different style of intake and discharge valves.

Figure 10 is a sectional view similar to Figure 3 with cylinders further apart, different style of filter and a control relief valve between the cylinders.

Figure 11 is a detail, horizontal, sectional view similar to Figure 4, with cylinders further apart, with injection nozzles.

Figure 12 is a detail vertical sectional view taken on line 12—12, Figure 10.

Figure 13 is a detail vertical sectional view taken on line 13—13, Figure 10.

Figure 14 is a detail, horizontal, sectional view, similar to Figure 8, on an enlarged scale, with cylinders further apart and a different arrangement of exhaust.

Figure 15 is a detail view partly in vertical section and partly in elevation, similar to Figure 1, with parts broken away and parts omitted.

Referring more particularly to the drawings, the numeral 10 designates the engine housing having encased therein the power cylinders 11, in each of which cylinder pistons 12 and 13 reciprocate in directions towards and away from each other, and as the construction and operation of each cylinder with its pistons is the same the description of one will apply equally as well to all of them.

Connected to or formed integral with the upper power piston 13 is an air piston 14, which is preferably of a diameter considerably greater than the diameter of the piston 13, and the air piston 14 is reciprocable in an air cylinder 15 that is disposed above and adjacent to the upper end of the power cylinder 11.

A connecting rod or link 16 connects the lower power piston 13 with the crank pin 17 of a crank shaft 18, which latter is mounted for rotation in suitable bearings 19.

Connecting rods or links 20, here shown as comprising two rods, one on each side of the piston 13, form connections between the piston 13 as well as the air piston 14 with crank pins 21 of the crank shaft 18, so that during the movements of the pistons 12 and 13 toward and away from each other, the crank shaft 18 will be rotated. The cylinder 11 is provided adjacent its upper end with inlet ports 22 to permit of the entrance of air into the cylinder 11 beneath the piston 13. The cylinder is also provided with outlet ports 23 spaced a considerable distance below the inlet ports 22 to permit of the exit of the exhaust gases from the cylinder into an exhaust manifold 24, which manifold being entirely encased in engine housing 10, preferably completely surrounds the cylinder 11, and which exhaust manifold is provided with an exhaust outlet opening 25 for the products of combustion.

A water jacket 26 completely surrounds the exhaust manifold 24 and also a greater portion of the power cylinder 11, and this water jacket is also entirely encased in engine housing 10.

A crank case 27 is provided in which the crank shaft 18 and crank pins 17 and 21 rotate, the cylinder 11 opening at its bottom into the crank case. Arranged between the air cylinder 15 and the end of the power cylinder 11 is a chamber 29 which has communication with the air cylinder, and 28 designates passageways forming communication between the chamber 29 and the crank case 27 to form passageways or guides through which the connecting rods or links 20 that connect the piston 13 with the crank pins 21, freely pass.

The air piston 14 operating in the air cylinder 15 may be provided with depending projections or shoes 14ª which serve as a means for assisting in guiding the piston in the cylinder 15 and to resist lateral strain of the connecting rods 20, and thereby relieve to a considerable extent, the lateral pressure on the piston 14.

The chamber 29 also serves as an inspection space which opens through the housing of the engine, and a closure 30 is provided for such opening, and which closure may be constructed of any suitable material either transparent or opaque.

An air inlet valve 31 controls an air inlet opening in the end of the air cylinder 15 and an air outlet valve 32 controls an outlet opening in the end of the air cylinder 15, both of these valves being preferably spring loaded.

The engine casing is provided with an air inlet opening 33 to admit air under atmospheric pressure into a receiving chamber 34, which preferably encompasses the air chamber, and which chamber or space 34 is preferably employed for conditioning the air, and this may be accomplished by means of a filter 34ª within the space 34, or in any other suitable manner.

An opening 35 forms communication between the chamber or space 34 and the air inlet valve chamber 37 through the top plate 36, and in which chamber 37 the air inlet valve 31 operates, and 42 designates a communicating opening between the air chamber or space 43 and the chamber 39, in which the outlet valve 32 operates, and which chamber 39 receives compressed air from the air cylinder 15, through the outlet opening controlled by the outlet valve 32, the chambers 37 and 39 being separated from each other by means of a separating partition 40.

With this construction it will be manifest that as the filter 34ª fits within the opening 33 air will pass through the filter and into the space or chamber 34 and will flow through the opening 35 into the chamber 37, the suction of the piston 14 on its downward stroke, opening the valve 31, permitting the air to flow into the air chamber 15. Upon the upward stroke of the piston 14, the pressure created upon the air in the cylinder 15 will unseat the valve 32 to permit the air to be discharged from the cylinder 15 into the chamber 39, and thence through the opening 42 into the space or chamber 43, which also encompasses a portion of the cylinder 15, and which chambers or spaces 34 and 43 are separated from each other by means of partitions 44, as shown more clearly in Figure 3 of the drawings, and which chambers are entirely encased in the engine housing 10.

The chambers 37 and 39 are provided with a cover plate 41 forming one of the walls of the chamber.

With this construction it will be manifest that the compressed air will be transferred into the space or chamber 43 and will then be discharged through a connecting pipe or passage 45 into an air storage chamber 46, which surrounds the power cylinder 11, which is also entirely encased within the engine housing 10. While in Figure 1 the passage 45 is shown as being located outside of the casing or housing 10, it is to be understood that this passage may be located and housed within the casing 10, as shown more clearly in Figure 13.

Compressed air from the air storage chamber 46 is admitted to the power cylinder 11 through the inlet ports 22, when the latter are opened by reason of the bottom edge of the upper power piston 13 uncovering such ports. This will occur when the crank pins 21 are in top dead center positions, and crank pin 17 is in the lower dead center position. In this position the lower power piston 12 will then open the outlet or exhaust ports 23, permitting escape of the exhaust gases from the cylinder 11 and also permitting scavenging of the cylinder 11 by the air entering the power cylinder through the ports 22 and discharging through the ports 23.

In the wall of the passage 45 in the form of the invention shown in Figure 1, and in the wall of the casing 10 in the form of the invention shown in Figures 10 and 13, is provided an opening 47 to receive a valve seat 48, which latter is secured in position in any suitable manner, and the valve seat is provided with a hub portion 48ª having internal screw threads.

A relief valve 49 controls an opening 49ª in the valve seat 48 and the valve is held to the seat by means of a spring 50, which latter is controlled by means of a control lever 51. The valve 49 is preferably provided with a tubular portion which telescopes with a portion of the valve controlled lever 51, and within these tubular portions the spring 50 is located. The spring exerts its stress in a direction to seat the valve 49.

The lever 51 is provided with a threaded boss 52 fitting into the threaded hub or portion 48ª.

It will be manifest that by turning or actuating the control lever 51, the relative position of the lever with regard to the valve seat 48 and particularly the opening 49 therein may be adjusted and therefore also the tension of the spring 50 may be varied.

A boss 53 on the control lever 51 is provided by means of which the lever may be operated manually by hand or automatically by being connected either to the governor of the engine or to any other suitable device for actuating the lever to control the speed and power of the engine.

An oil pan 54 is also provided for the crank case.

The power fuel is supplied through an injector nozzle 55, which latter is connected by means of a pipe 56 to the source of supply, the fuel nozzle discharging into the cylinder 11 between the pistons 12 and 13, through a suitable opening 57.

It is thought that the operation of this improved type of engine will be clearly understood from the foregoing specification, but briefly stated it is as follows.

As is well known, Diesel engines depend for the ignition of their fuel oil upon high temperatures raised by the compression of atmospheric air.

Assuming now for the sake of explanation, that the engine is started from a cold condition, and that the lower power piston 12 is in its lowermost position, that is the bottom dead center position, as shown more clearly in Figure 7, and the upper power piston 13, with the air piston 14 in its highest position, that is the top dead center position.

In this position of the pistons, the power cylinder 11, the air cylinder 15 and all the communicating spaces and ports are filled with air of atmospheric pressure.

When starting the engine by turning the crank shaft 18, the piston 12 will move upwards and the piston 13 downwards, that is towards each other, thereby closing the ports 22 and 23 and compressing the air between the two pistons 12 and 13, as shown in Figure 1.

The air piston 14 will also move downward together with the piston 13, causing a partial vacuum between the air piston 14 and the air cylinder head 38. This will cause the air inlet valve 31 to open, due to the difference in pressure below and above the inlet valve 31.

Atmospheric air will continue to stream into the air cylinder 15 above the piston, until the air piston 14 reaches the lowest or bottom dead center position. In this position the air between the two power pistons 12 and 13 will be highly compressed, whereby the temperature of the air will be raised sufficiently high to ignite fuel oil which is injected into this highly compressed air through the fuel oil injector nozzle 55.

Due to the now following explosion the two pistons 12 and 13 will move apart; the air piston 14 will move upwardly together with the piston 13, causing the air inlet valve 31 to be closed thereby, and the trapped air in the air cylinder to be compressed until the pressure in the air cylinder 15 reaches a pressure sufficient to open the air outlet valve 32.

The compressed air from cylinder 15 will be discharged into the spaces and chambers 39, 43, 45 and 46, and by continued rotation of the crank shaft 18, the air pressure in these spaces will be built up high enough to form an air storage or pressure around the power cylinder 11, and from which air storage air for scavenging and combustion purposes is discharged through the ports 22, during the operation of the engine, whenever the ports 22 are uncovered by the piston 13.

Ordinarily, air piston 14 is designed just large enough to supply the amount of air necessary for the combustion of fuel, plus a certain amount for scavenging the power cylinder and plus another amount for losses through the exhaust ports 23.

With the present invention, however, it is proposed to construct the air piston large enough to furnish besides the customary amount of air an additional air supply for supercharging. Supercharging, of course, is only possible when with a larger amount of fuel oil simultaneously, a larger amount of air for the combustion of this increased amount of fuel, is furnished.

This means that when the engine is running under normal load condition, that is, when not supercharging, the enlarged air piston of this engine will cause an increase in the air pressure in the passages and chambers 39, 42, 43, 45 and 46. Since it is desired in an economical engine to operate with the smallest amount of air pressure for the scavenging and recharging of the power cylinder 11, this invention provides suitable means to discharge the excess air supply by the piston 14 when running under normal load. One method of accomplishing this result embodies a relief valve 49 the function of which is to maintain a certain fixed pressure after the spring 50 has been set for this predetermined pressure.

If it is now desired to supercharge the engine, that is to supply an excess of fuel oil by a fuel oil pump designed for maximum overload and a correspondingly necessary excess supply of air, then in this case all that is necessary to do is to increase the tension of the spring 50, so that the relief valve 49 will open at a higher pressure in the spaces and chambers 39, 42, 43, 45 and 46, or not at all. The control mechanism of the fuel oil pump may of course be connected with the operating mechanism of the relief valve 49 or the air inlet valve 31 in some well known manner and be operated either manually or automatically, separately or combined.

It is to be understood that the relief valve 49, shown in the drawings, is only used as an example for accomplishing supercharging with the simplest means possible. However, there are other devices with which supercharging is possible. For instance, a design permitting the suction valve 31 to be kept open during a fraction of the discharge stroke of air piston 14, so that a portion of the incoming air is being returned to the atmosphere again.

Air of higher pressure is now available to stream into the power cylinder 11 through the inlet ports 22. As this higher air pressure means a greater quantity of oxygen for the same piston displacement, a greater amount of oil can be burnt for the same piston displacement, and consequently the mean effective pressure between the two piston 12 and 13 will rise, and thereby increase the output or horse power of the engine by such supercharging.

With this improved construction it will be manfest that one of the power pistons and the air piston are of an integral construction and at the same time forming a cross head with the guide shoes 14a for guiding and relieving the air piston 14 of lateral strain.

A portion of the air cylinder is surrounded by the receiving chamber 34 for conditioning the incoming atmospheric air, and the other portion of the air cylinder is surrounded by another chamber 43 for the compressed air that is discharged from the air cylinder.

The air storage space completely surrounds the power cylinder, with the result that the pressure supplied to the cylinder will be constant and it will also be manifest that the relief and pressure controlling valve will control the supply of air to the cylinder and will also control the functioning and power of the engine.

With this improved construction the air cylinder is of a greater capacity than customary with engines of this character, so as to supply an excess of air for supercharging.

While it has heretofore been attempted to balance oppositely operating pistons to reduce vibrations, by causing the upper piston to operate with less piston speed with respect to the operation of the lower piston, it has been found that in the prior constructions it is not possible to equalize the torque and power effects caused by such pistons on the crank shaft.

By the arrangement in the present invention, and particularly as shown in Figure 15, these difficulties and objections have been overcome.

It will be possible with the present invention to provide the upper portion of the power cylinder and consequently the upper power piston 13ª respectively of a larger bore and diameter than the lower power cylinder and piston 12, to more equally balance the moving parts of the engine, and it will further be manifest that with the present invention the exhaust manifold and the water cooling jacket completely surround the power cylinder and are disposed inside of the engine casing, so that the parts projecting beyond the plane of the outer surfaces of the engine housing will be reduced to a minimum.

It is also possible with this invention to provide any number of pipes 24ª with radiator fins and which pipes extend from the manifold 24 into the air storage chamber 46 around the power cylinder, and thus transmit heat from the manifold 24 to the combustion air in the storage chamber.

It is also possible with this design to omit the water cooling entirely and use air cooling instead on account of proximity of air storage chamber and exhaust manifold.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. An internal combustion engine embodying a cylinder having an inlet and an exhaust outlet, pistons operating in the cylinder in directions towards and away from each other, an air compressor embodying a reciprocable plunger formed integral with one of said pistons, guides other than the plunger rim and integral with said plunger for resisting lateral strain of the plunger, hubs also integral with said plunger, actuating rods pivotally connected by one end to said hubs, means for directing air from said compressor into the cylinder and between said pistons to be further compressed by the pistons, and means for injecting fuel into the fluid which is compressed between said pistons.

2. An internal combustion engine embodying a cylinder having an inlet and an exhaust outlet, pistons operating in the cylinder in directions towards and away from each other, an air compressor embodying a reciprocable plunger formed integral with one of said pistons, guides other than the plunger rim and integral with said plunger for resisting lateral strain of the plunger, hubs also integral with said plunger, actuating rods pivotally connected by one end with said hubs, means for directing air from said compressor into the cylinder and between said pistons to be further compressed by the pistons, and means for injecting fuel into the fluid which is compressed between said pistons, the said inlet and exhaust outlet being respectively controlled by said pistons.

3. An internal combustion engine embodying a cylinder having an inlet and an exhaust outlet, pistons operating in the cylinder in directions towards and away from each other, an air compressor embodying a reciprocable plunger formed integral with one of said pistons, means for directing air from said compressor into the cylinder and between said pistons to be further compressed by the pistons, means for injecting fuel into the fluid which is compressed between said pistons, a housing encompassing the air compressor and said cylinder, and an exhaust manifold with which said exhaust outlet has communication, said exhaust manifold encompassing said cylinder and disposed within said housing.

4. An internal combustion engine embodying a cylinder having an inlet and an exhaust outlet, pistons operating in the cylinder in directions towards and away from each other, an air compressor embodying a reciprocable plunger formed integral with one of said pistons, means for directing air from said compressor into the cylinder and between said pistons to be further compressed by the pistons, means for injecting fuel into the fluid which is compressed between said pistons, a housing encompassing the air compressor and said cylinder, an exhaust manifold with which said exhaust outlet has communication, said exhaust manifold encompassing said cylinder and disposed within said housing, and a water jacket surrounding said manifold and also disposed within said housing.

5. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication whereby compressed air from said chamber will be supplied between the pistons to be further compressed thereby, said chamber completely encompassing said cylinder for substantially the entire length of the latter, the cylinder inlet being controlled by one of said pistons, and means for injecting fuel into the compressed air between said pistons.

6. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication whereby compressed air from said chamber will be supplied between the pistons to be further compressed thereby, said chamber completely encompassing said cylinder for substantially the entire length of the latter, the cylinder inlet being controlled by one of said pistons, means for injecting fuel into the compressed air between said pistons, an exhaust manifold encompassing said cylinder and with which manifold the cylinder outlet has communication, and a casing housing said cylinder, compressor, chamber and exhaust manifold.

7. An internal combustion engine embodying a cylinder, pistons reciprocable in said cylinder in directions towards and away from each other, a fluid compressor for supplying compressed fluid to the cylinder between the pistons to be further compressed thereby, means for injecting fuel into the fluid which is compressed between the pistons, and positively actuated means operating automatically to control the degree of pressure of the fluid supplied to said cylinder.

8. An internal combustion engine embodying a cylinder, pistons reciprocable in said cylinder in directions towards and away from each other, a fluid compressor for supplying compressed fluid to the cylinder between the pistons to be further compressed thereby, means for injecting fuel into the fluid which is compressed between the pistons, and means operating automatically to control the degree of pressure of the fluid supplied to said cylinder, the last recited means embodying an escape opening, a loaded valve for controlling said escape opening, and means for varying at will the stress of said load upon the said valve.

9. An internal combustion engine embodying a cylinder, pistons reciprocable therein towards and away from each other, a fluid compressor, a storage chamber for receiving and storing the fluid from said compressor, means for supplying the compressed fluid to the cylinder between the pistons to be further compressed thereby, means for injecting fuel into the compressed fluid between the piston, and an exhaust manifold for the cylinder, said manifold being in close proximity to said chamber whereby the compressed fluid in the chamber will be heated thereby.

10. An internal combustion engine embodying a cylinder, pistons reciprocable therein towards and away from each other, a fluid compressor, a storage chamber for receiving and storing the fluid from said compressor, means for supplying the compressed fluid to the cylinder between the pistons to be further compressed thereby, means for injecting fuel into the compressed fluid between the pistons, and an exhaust manifold for the cylinder, said manifold being in close proximity to said chamber whereby the compressed fluid in the chamber will be heated thereby, the said chamber and exhaust manifold encompassing the cylinder, and a casing housing said cylinder, chamber and exhaust manifold.

11. An internal combustion engine embodying a cylinder, pistons reciprocable therein towards and away from each other, a compressor cylinder, a plunger reciprocable therein and responsive in its operation to one of said pistons, means for supplying the fluid from said compressor to the cylinder between the pistons to be further compressed thereby, air receiving chambers adjacent the compressor cylinder, one of said chambers having an opening for receiving atmospheric air, there being an inlet opening forming communication between the last said chamber and said compressor cylinder, there being an outlet opening from said compressor cylinder to the other of said chambers, valves controlling the said inlet and outlet openings and themselves controlled by the operation of said plunger, and a casing housing said cylinders and said valves.

12. An internal combustion engine embodying a cylinder, pistons reciprocable therein towards and away from each other, a compressor cylinder, a plunger reciprocable therein and responsive in its operation to one of said pistons, means for supplying the fluid from said compressor to the cylinder between the pistons to be further compressed thereby, air receiving chambers adjacent the compressor cylinder, one of said chambers having an opening for receiving atmospheric air, there being an inlet opening forming communication between the last said chamber and said compressor cylinder, there being an outlet opening from said compressor cylinder to the other of said chambers, valves controlling the said inlet and outlet openings and themselves controlled by the operation of said plunger, a casing housing said cylinders and said valves, and means for temporarily retarding the closing of inlet valve under the action of said plunger.

13. An internal combustion engine embodying a cylinder having inlet and outlet ports, pistons reciprocable in the cylinder and controlling said ports, a fluid compressor cylinder, a plunger operating in the compressor cylinder, means for supplying the compressed fluid to the first said cylinder to be further compressed between the pistons, means for injecting fuel into the compressed fluid between the pistons, said fluid compressor cylinder being of a size to provide a displacement by said plunger of a quantity of compressed fluid considerably greater than the amount of compressed fluid necessary for combustion in the first said cylinder under normal loads, and means whereby the degree of pressure of the fluid which is supplied from the compressor cylinder to the first said cylinder may be varied at will.

14. An internal combustion engine embodying an engine casing, a cylinder housed in said casing, pistons reciprocable in the cylinder and controlling the inlet and outlet ports thereof, a fluid compressor cylinder adjacent the first said cylinder, a plunger reciprocable in the compressor cylinder, a compressed air storage chamber encompassing the first said cylinder, said inlet forming a communication between said chamber and the first said cylinder, an exhaust manifold completely encompassing the first said cylinder and with which the exhaust outlet of the first said cylinder communicates, all of said parts being superposed in close proximity to each other and entirely housed within said casing, and means for injecting fuel into the compressed fluid between said pistons.

15. An internal combustion engine embodying an engine casing, a cylinder housed in said casing, pistons reciprocable in the cylinder and controlling the inlet and outlet ports thereof, a fluid compressor cylinder adjacent the cylinder, a plunger reciprocable in the compressor cylinder, a compressed air storage chamber encompassing the first said cylinder, said inlet forming a communication between said chamber and the first said cylinder, an exhaust manifold completely encompassing the first said cylinder and with which the exhaust outlet of the first said cylinder communicates, all of said parts being superposed in close proximity to each other and entirely housed within said casing, means for injecting fuel into the compressed fluid between said pistons, and a water jacket encompassing said manifold and the first said cylinder and being also completely housed within said casing.

16. An internal combustion engine embodying a casing, a cylinder housed therein, pistons operating in the cylinder, a compressor also in the housing, a storage chamber for the compressed fluid from the compressor, said storage chamber also within the casing, means for directing the compressed fluid from the chamber into the cylinder between the pistons to be further compressed thereby, an exhaust manifold adjacent said chamber, and also within the casing, and means for directing a portion of the exhaust gases from said manifold into said chamber and out of commingling relation with the fluid in said chamber.

17. An internal combustion engine embodying a casing, a crank case within and at the lower portion of the casing, a fluid compressing chamber within and adjacent the top of the casing, a compressed fluid storage chamber below and having communication with said compressing chamber, an inspection chamber between the fluid compressing chamber and the compressed fluid storage chamber, a cylinder encompassed by the fluid storage chamber and having communication therewith whereby air under pressure from the fluid storage chamber may be supplied to the cylinder to be further compressed therein, said cylinder having open ends and extending into and communicating respectively with the crank case and the said inspection chamber, a cooling chamber within the casing and disposed intermediate the crank case and the compressed fluid storage chamber, an exhaust manifold within said cooling chamber and encompassing said cylinder and with which manifold the exhaust outlet of the cylinder has communication, opposed pistons operating in the cylinder and respectively controlling the fluid inlet and the exhaust outlet of the cylinder, a plunger operatively connected with one of the pistons and operating in the compressing chamber to compress fluid therein, and means for injecting fuel into the compressed fluid between the said pistons.

18. An internal combustion engine embodying a casing, a crank case within and at the lower portion of the casing, a fluid compressing chamber within and adjacent the top of the casing, a compressed fluid storage chamber below and having communication with said compressing chamber, an inspection chamber between the fluid compressing chamber and the compressed fluid storage chamber, a cylinder encompassed by the fluid storage chamber and having communication therewith whereby air under pressure from the fluid storage chamber may be supplied to the cylinder to be further compressed therein, said cylinder having open ends and extending into and communicating respectively with the crank case and the said inspection chamber, a cooling chamber within the casing and disposed intermediate the crank case and the compressed fluid storage chamber, an exhaust manifold within said cooling chamber and encompassing said cylinder and with which manifold the exhaust outlet of the cylinder has communication, opposed pistons operating in the cylinder and respectively controlling the fluid inlet and the exhaust outlet of the cylinder, a plunger operatively connected with one of the pistons and operating in the compressing chamber to compress fluid therein, means for injecting fuel into the compressed fluid between the said pistons, and means for directing fluid from said compressing chamber into said cooling chamber.

19. An internal combustion engine embodying a cylinder having an inlet and an exhaust outlet, pistons operating in the cylinder in directions towards and away from each other, one of said pistons being of a greater diameter than the diameter of the other piston to equalize the torque and power effects of said piston on the crank shaft, an air compressor embodying a reciprocable plunger formed integral with one of said pistons, guides other than the plunger rim and integral with said plunger for resisting lateral strain of the plunger, hubs also integral with said plunger, actuating rods pivotally connected by one end to said hubs, means for directing air from said compressor into the cylinder and between the pistons to be further compressed by the pistons, and means for injecting fuel into the fluid which is compressed between said pistons.

20. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication whereby compressed air from said chamber will be supplied between the pistons to be further compressed thereby, said chamber completely encompassing said cylinder for a greater part of the length of the latter, the cylinder inlet being controlled by one of said pistons, said compressor embodying a cylinder and said compressed air chamber partially encompassing said compressor cylinder, and means for injecting fuel into the compressed air between said pistons.

21. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication, whereby compressed air from said chamber will be supplied between the pistons to be further compressed thereby, said chamber completely encompassing said cylinder for a greater part of the length of the latter, the cylinder inlet being controlled by one of said pistons, said compressor embodying a cylinder and a compressed air receiving and storage chamber partially encompassing the compressor cylinder, there being an unobstructed passage forming communication between the air receiving and storage chambers, and means for injecting fuel into the compressed air between said pistons.

22. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication whereby compressed air from said chamber will be supplied between the pistons to be further compressed thereby, said chamber completely encompassing said cylinder for a greater part of the length of the latter, the cylinder inlet being controlled by one of said pistons, said compressor embodying a cylinder and a compressed air receiving and storage chamber partially encompassing the compressor cylinder, there being an unobstructed passage forming communication between the air receiving and storage chambers, an engine casing, said compressed air receiving and storage chambers and the said connecting passage therebetween being all housed within said casing, and means for injecting fuel into the compressed air between said pistons.

23. An internal combustion engine embodying a cylinder having an inlet and an exhaust outlet, pistons reciprocable in the cylinder in directions towards and away from each other, an air compressor embodying a reciprocable plunger connected to one of said pistons, a chamber for receiving and storing compressed air from said compressor and with which chamber said inlet has communication whereby compressed air from said chamber will be supplied between the pistons to be further compressed thereby, said chamber completely encompassing said cylinder for a greater part of the length of the latter, the cylinder inlet being controlled by one of said pistons, said compressor embodying a cylinder, a compressed air receiving and storage chamber partially encompassing the compressor cylinder, there being an unobstructed passage forming communication between the air receiving and storage chambers, an air inlet chamber out of communication with the air receiving and storage chambers, said air inlet chamber partially encompassing the compressor cylinder, and means for injecting fuel into the compressed air between the pistons.

24. An internal combustion engine embodying a casing, a cylinder housed therein, pistons operating in the cylinder, a compressor also in the housing, a storage chamber for the compressed fluid from the compressor, said storage chamber also within the casing, means for directing the compressed fluid from the chamber into the cylinder between the pistons to be further compressed thereby, an exhaust manifold adjacent said chamber and also within the casing, and means for directing a portion of the exhaust gases from said manifold into said chamber and out of commingling relation with the fluid in said chamber, the last recited means embodying pipes extending from said manifold into the said chamber, said pipes being in communication with the manifold and out of communication with said chamber.

25. An internal combustion engine embodying a casing, a crank case within and at the lower portion of the casing, a fluid compressing chamber within and adjacent the top of the casing, a compressed fluid storage chamber below and having communication with said compressing chamber, an inspection chamber between the fluid compressing chamber and the compressed fluid storage chamber, a cylinder encompassed by the fluid storage chamber and having communication therewith whereby air under pressure from the fluid storage chamber may be supplied to the cylinder to be further compressed therein, said cylinder having open ends and extending into and communicating respectively with the crank case and the said inspection chamber, a cooling chamber within the casing and disposed intermediate the crank case and the compressed fluid storage chamber, an exhaust manifold within said cooling chamber and encompassing said cylinder and with which manifold the exhaust outlet of the cylinder has communication, opposed pistons operating in the cylinder and respectively controlling the fluid inlet and the exhaust outlet of the cylinder, a plunger operatively connected with one of the pistons and operating in the compressing chamber to compress fluid therein, a portion of the compressed fluid storage chamber partially encompassing the said compressor chamber, and means for injecting fuel into the compressed fluid between the said pistons.

26. An internal combustion engine embodying a casing, a crank case within and at the lower portion of the casing, a fluid compressing chamber within and adjacent the top of the casing, a compressed fluid storage chamber below and having communication with said compressing chamber, an inspection chamber between the fluid compressing chamber and the compressed fluid storage chamber, a cylinder encompassed by the fluid storage chamber and having communication therewith whereby air under pressure from the fluid storage chamber may be supplied to the cylinder to be further compressed therein, said cylinder having open ends and extending into and communicating respectively with the crank case and the said inspection chamber, a cooling chamber within the casing and disposed intermediate the crank case and the compressed fluid storage chamber, an exhaust manifold within said cooling chamber and encompassing said cylinder and with which manifold the exhaust outlet of the cylinder has communication, opposed pistons operating in the cylinder and respectively controlling the fluid inlet and the exhaust outlet of the cylinder, a plunger operatively connected with one of the pistons and operating in the compressing chamber to compress fluid therein, a portion of the compressed fluid storage chamber partially encompassing said compressor chamber, a fluid inlet chamber for supplying air to the compressor chamber, said fluid inlet chamber partially encompassing the fluid compressing chamber, and means for injecting fuel into the compressed fluid between said pistons.

27. An internal combustion engine embodying a casing, a crank case within and at the lower portion of the casing, a fluid compressing chamber within and adjacent the top of the casing, a compressed fluid storage chamber below and having communication with said compressing chamber, an inspection chamber between the fluid compressing chamber and the compressed fluid storage chamber, a cylinder encompassed by the fluid storage chamber and having communication therewith whereby air under pressure from the fluid storage chamber may be supplied to the cylinder to be further compressed therein, said cylinder having open ends and extending into and communicating respectively with the crank case and the said inspection chamber, a cooling chamber within the casing and disposed intermediate the crank case and the compressed fluid storage chamber, an exhaust manifold within said cooling chamber and encompassing said cylinder and with which manifold the exhaust outlet of the cylinder has communication, opposed pistons operating in the cylinder and respectively controlling the fluid inlet and the exhaust outlet of the cylinder, a plunger operatively connected with one of the pistons and operating in the compressing chamber to compress fluid therein, a compressed fluid receiving and storage chamber partially encompassing the said compression chamber, there being an unobstructed passage forming communication between the said compressed fluid receiving and storage chambers, and means for injecting fuel into the compressed fluid between the said pistons.

28. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by increasing the pressure of the air supplied for scavenging and for combustion.

29. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by increasing the pressure of the air supplied for scavenging and for combustion, and also providing a combustion volume between the pistons in excess of the volume required under such normal conditions.

30. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by superheating the air before it enters the combustion chamber, and simultaneously therewith providing a combustion volume between the pistons in excess of the volume required under such normal load conditions.

31. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by providing a combustion volume between the pistons in excess of the volume required under such normal conditions.

32. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads and superheating the air before it enters the combustion chamber.

33. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by increasing the pressure of the air supplied for scavenging and combustion, by providing a combustion chamber between the pistons in excess of the volume required under such normal conditions and also by superheating the air before it enters the combustion chamber.

34. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air escape through a manually or automatically controlled valve at the air reservoir.

35. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air taken into the air compressor cylinder escape through the suction valves during a part of the return stroke of the air compressor piston maintaining thereby the required air pressure corresponding to the fuel requirements of any load from zero to a maximum overload.

36. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air escape through a manually or automatically controlled valve at the air reservoir, and simultaneously regulating the volume of the combustion chamber.

37. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air escape through a manually or automatically controlled valve at the air reservoir, and simultaneously regulating the volume of the combustion chamber and also regulating the temperature in the air reservoir.

38. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air taken into the air compressor cylinder escape through the suction valves during a part of the return stroke of the air compressor piston and simultaneously therewith regulating the volume of the combustion chamber.

39. The method of supercharging and regulating an engine of the type described which consists in supplying thereto an amount of fuel in excess of the amount ordinarily required to produce power for a normal load, and simultaneously therewith storing in a reservoir completely surrounding the power cylinders and supplying to the combustion chamber an amount of air in excess of the amount required under such normal loads and regulating the pressure in the air reservoir by letting part of the air taken into the air compressor cylinder escape through the suction valves during a part of the return stroke of the air compressor piston, by simultaneously therewith regulating the volume of the combustion chamber and also regulating the temperature in the air reservoir.

40. The method of supercharging an engine of the type described, which consists in supplying thereto an amount of fuel in excess of the amount ordinarily necessary to produce power for a normal load, and simultaneously therewith storing in a reservoir completely surrounding the power cylinders and supplying to the combustion chamber an amount of air in excess of the amount required under such normal loads, by increasing the pressure of the air supplied for scavenging and combustion and by superheating the air before it enters the combustion chamber.

GUSTAV R. GEHRANDT.